United States Patent

[11] 3,629,042

| [72] | Inventor | John D. Cranfill |
| | | Frankfort, Ill. |
| [21] | Appl. No. | 738,452 |
| [22] | Filed | June 20, 1968 |
| [45] | Patented | Dec. 21, 1971 |
| [73] | Assignee | W. R. Frank Packaging Engineers, Inc. |

[54] METHOD OF EMBOSSING A THREE DIMENSIONAL MEDALLION INTO A THERMOPLASTIC RESIN SUBSTRATE
5 Claims, 3 Drawing Figs.

[52] U.S. Cl............................................. 156/303.1,
156/209, 156/298, 264/293
[51] Int. Cl....................................................... B29c 3/00,
B31f 3/00
[50] Field of Search........................................ 156/303.1,
298, 209, 219, 228, 256, 306, 334; 264/293, 163,
160; 101/21, 27, 31, 32; 18/36

[56] References Cited
UNITED STATES PATENTS
| 3,520,751 | 7/1970 | Cranfill | 156/209 |
| 2,431,393 | 11/1947 | Franklin | 264/163 X |
| 2,757,372 | 7/1956 | Chambon | 101/32 |
| 3,200,025 | 8/1965 | Edmondson | 156/209 |
| 3,411,438 | 11/1968 | Reader et al. | 101/DIG. 4 |
| 3,478,680 | 11/1969 | Anderson, Jr. | 101/32 |

FOREIGN PATENTS
| 226,537 | 1/1960 | Australia | 156/209 |
| 538,559 | 8/1941 | Great Britain | 156/303.1 |

Primary Examiner—Carl D. Quarforth
Assistant Examiner—E. E. Lehmann
Attorney—Dressler, Goldsmith, Clement and Gordon ABSTRACT: A method for embossing a piece of metal foil or the like into a thermoplastic resin substrate such as a cap or container to form a three-dimensionally shaped medallion in the substrate. A piece of foil, generally backed with an adhesive, is pressed into the substrate by means of a die having a shape complementary to the desired shape of the medallion. The die, which is maintained at a temperature of from about 375° to 435° F., presses the foil into the substrate at a pressure of at least about 500 p.s.i. for a period of from 0.25 to 3 seconds. The die has a sharp cutting ridge about its periphery to inhibit outward flow of plastic during pressing. The large, flat surfaces of the die are generally stippled to prevent the formation of air-containing blisters between the plastic substrate and the foil medallion. The peripheral cutting ridge of the die can also be used to cut the foil medallion from a larger sheet of foil before it is embossed into the plastic substrate. The outer portion of the cutting ridge generally has a draft of no more than ½° upwardly and outwardly to minimize the unsightly buildup of a lip of thermoplastic material about the cutting ridge during the embossing process.

PATENTED DEC 21 1971  3,629,042

INVENTOR
John D. Cranfill

BY Dressler, Goldsmith, Clement & Gordon
ATTORNEYS

3,629,042

METHOD OF EMBOSSING A THREE DIMENSIONAL MEDALLION INTO A THERMOPLASTIC RESIN SUBSTRATE

BACKGROUND OF THE INVENTION

This invention relates to a method for embossing medallions made of foil or the like into thermoplastic resin substrates such as caps and hollow containers made of polystyrene, polypropylene, or the like.

While it is known to emboss foil medallions into cardboard and other substrates to produce a three-dimensional inlay in the surface of the substrate for decorative purposes, it has been difficult to attain high quality foil embossments on thermoplastic substrates, which embossments are essentially free of air pockets between the substrate and the foil or other material used, and which have good adhesion. It has been particularly difficult to provide good adhesion between foil medallions and the olefinic thermoplastic resins such as polyethylene and polypropylene, and the problem has been similar for other thermoplastic materials such as polyvinylchloride and acetal resins.

The process of this invention results in foil embossments having improved adhesion between foil medallions and the above resins. In a preferred embodiment, this process also provides inlaid, three-dimensional medallions in thermoplastic substrates which are essentially free of air pockets and which show improved detail of pattern, permitting finer and more intricate designs to be embossed into such medallions carried by resin substrates.

SUMMARY OF THE INVENTION

This application relates to the process of embossing a piece of flexible film into a thermoplastic resin substrate to form a three-dimensional medallion embedded in the surface of said substrate, which process comprises pressing said piece of flexible film flat into the resin substrate with a die at a pressure of at least 500 p.s.i. for a period of from 0.25 to 3 seconds, said die having a temperature from 375° to 435° F., said die having a shape complementary to the desired three-dimensional shape of said embedded medallion, and also having about its periphery a sharp-cutting ridge to define a pressure zone on said substrate and to inhibit outward flow of plastic from said pressure zone during pressing.

By the above process, a medallion is formed in the thermoplastic resin which is contoured to a desired shape and which has excellent adhesion to the substrate. During the above process, the heated die presses not only the flexible film but also a portion of the thermoplastic resin substrate underneath the film into the shape dictated by the die, to support the flexible film in its desired three-dimensional shape. Because of the fact that he plastic underneath the medallion is thus shaped to conform closely to the desired three-dimensional configuration of the medallion, finer detail and greater sharpness of line results in the medallion through the process of this invention.

Although metallic foils such as aluminum foil are generally used as the flexible film, other flexible films such as plastic films with or without a metallized coating can be used in the process of this invention. Suitable thermoplastic resins for use as the substrate herein include polyethylene, polypropylene, polyamide resins such as nylon, polyacrylate resins such as polymethylmethacrylate, halogenated resins such as polyvinylchloride, acetal resins (e.g. Delrin, sold by Du Pont), and A.B.S. resins.

Typically, the flexible film is coated with a conventional adhesive for the thermoplastic resin into which it is to be embossed. It is convenient to use either a heat sensitive or pressure sensitive adhesive.

Superior results are obtained when a high pressure, at least 500 p.s.i. and often in excess of 1,000 p.s.i., is brought to bear against the flexible film and the resin substrate for a longer period of time rather than merely providing a pulse of high pressure, as in an inertial stamping process, in which high pressures are applied for a period of only one one-hundredth of a second or so. The use of a pressing step which lasts for a longer period of time appears to allow the plastic underneath the flexible film being pressed to flow into the desired configuration determined by the shape of the die, resulting in an embossed medallion which shows fine detail of contour and which is essentially free of air spaces between the plastic substrate and the medallion. The use of a longer time of pressure also reduces breakage by shock when the more brittle plastics such as polymethylmethacrylate are used as the substrate.

Generally, the period during which the die presses the flexible film against the thermoplastic resin substrate (called the "dwell time") which gives best results is inversely dependent upon the temperature of the die and the pressure exerted. What is required is sufficient time for the thermoplastic underneath the flexible film to soften and flow into the configuration dictated by the die, to eliminate air blisters and to fully support the desired configuration of the embedded medallion.

At a generally constant pressure, an excessively long dwell time for the particular temperature will cause the sharp cutting ridge about the periphery of the die to melt the plastic adjacent to it, resulting in an embedded medallion having an unsightly lip of plastic about its periphery.

At the low extreme of the temperature range of this process, a long dwell time is generally required in order to obtain sufficient flow of plastic underneath the embedded medallion to eliminate air blisters and obtain good adhesion, but the dwell time cannot be so long that a large amount of plastic substrate is melted about the periphery of the die, resulting in the formation of the lip of plastic mentioned above and other irregularities. Below the lower extreme of the stated temperature range, it is often difficult to find any dwell time which results in good plastic flow under the medallion, coupled with minimized formation of the plastic lip mentioned above.

At the high extreme of the range of die temperatures, the dwell time is usually shorter in order to prevent excessive melting of the plastic substrate about the periphery of the die, and to avoid overmelting of the plastic under the medallion, resulting in loss of detail in its contour. At higher die temperatures still, the cutting ridge of the die can instantly cause the plastic to rapidly melt and flow away from the periphery of the die in an effect similar to that of a hot knife cutting into paraffin.

Thermoplastic resins having higher melting points can be subjected to a higher die temperatures and longer dwell times than those with lower melting points.

The desirable results of this invention are achieved by pressing the die against the substrate at a pressure of at least 500 p.s.i. for a period of from 0.25 to 3 seconds, the die being at a temperature of from 375° to 435° F. Often the pressing step of this invention is performed at a minimum of 500 p.s.i. for a period of one-half to 1 second at a die temperature of 375° to 425° F.

If desired, in circumstances in which the three-dimensional contour of the medallion is large, the plastic substrate can be roughly preformed into the desired shape prior to embedding the medallion.

The majority of designs which are desirably impressed into medallions have flat areas which lend contrast to the raised design in the rest of the medallion. The best results are obtained in the process of this invention when such flat areas in the die are roughened so that the die is essentially free of flat, smooth areas having dimensions greater then one-eighth inch. In other words, the flat, smooth areas should generally have a size and shape no larger than to barely permit two crossed, generally perpendicular lines, each one-eighth inch in length, to fit within the area. It has been found that air blisters tend to collect under flat, smooth areas of larger size, and that the blisters are essentially eliminated by a slight roughening of the surface of the die, which roughening is transmitted to the surface of the embedded medallion and substrate.

THE DRAWINGS

DESCRIPTION OF A SPECIFIC EMBODIMENT

Figure 1:
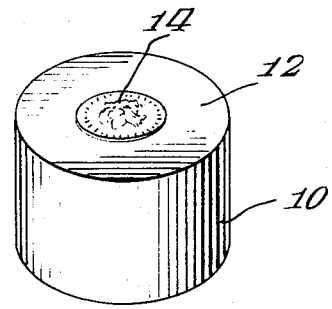
FIG. 1 is a perspective view of a thermoplastic cap for a container having a foil medallion embedded therein in a three-dimensional configuration.

FIG. 1 discloses a typical product of the process of this invention. A hollow polypropylene plastic container cap 10 has a top wall 12 in which there is embossed a medallion 14 having a three-dimensional shape defining lettering and/or an artistic design on its surface. The medallion is typically made of aluminum foil, coated on its side in contact with cap 10 with an adhesive. The medallion is optionally anodized or painted any color desired. A ready-made foil, having a heat-activable adhesive coating, which is suitable for use herein is sold under the trademark APPLIQUE by the Arvey Corporation of Chicago, Ill.

Figure 2:
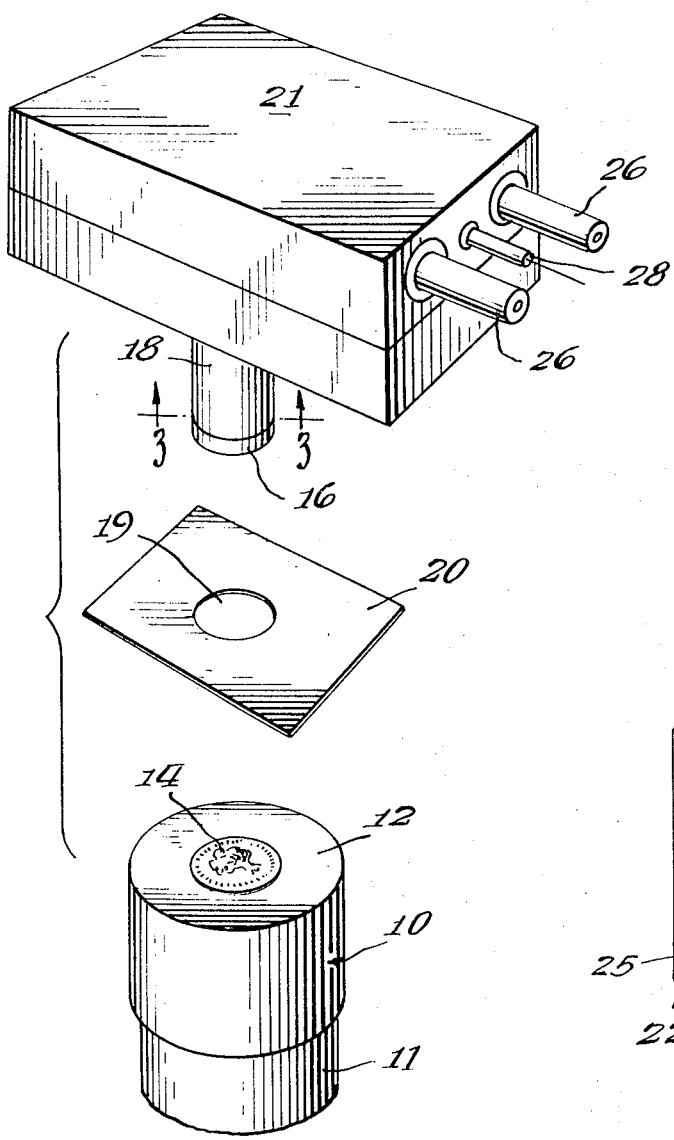
FIG. 2 is a diagrammatic view of the major components used in an apparatus for performing the process of this invention, the components being vertically separated for clarity.
Figure 3:
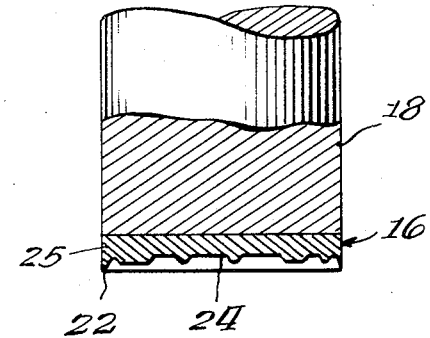
FIG. 3 is a sectional view, taken along line 3—3 of FIG. 2, of a typical die used in the process of this invention, mounted on a shaft which is shown in partial section.

FIGS. 2 and 3 shown the apparatus used for placing medallions upon thermoplastic resin substrates in three-dimensional form. Thermoplastic cap 10, which is the substrate in this instance, rests upon a support 11 which positions cap 10 and provides firm support against the underside of top wall 12 of cap 10 to protect it from breakage when exposed to the heavy embossing pressures used in the process of this invention. Embossing die 16 is carried by shaft 18 to move vertically up and down for embossing a series of medallions into a series of caps 10. Medallion 14 is shown after embossment upon top wall 12 of cap 10. As heated die 16 is driven downwardly by shaft 18, it passes through a sheet 20 of taut embossing foil, cutting out the medallion 14 as it passes, leaving hole 19 in the sheet. The heated die then engages top wall 12 of cap 10, and embeds the medallion in the desired three-dimensional configuration in accordance with the conditions described above. Shaft 18 is, in turn, driven by a conventional drive means 21.

FIG. 3 shows a detailed cross-sectional view of the embossing die 16. Cutting ridge 22 defines the periphery of die 16. Ridge 22 is used to cut medallion 14 out of sheet 20 as the die passes therethrough, and to carry medallion 14 to the proper position on cap 10. Then, as the heated die 16 is pressed against the medallion 14 and top wall 12 of cap 10, ridge 22 inhibits the flow of melted thermoplastic away from beneath medallion 14 during the pressing step, forcing the thermoplastic to flow instead into a configuration under medallion 14 which is complementary to the configuration of the shaping face 24 of die 16.

It is desirable for the peripheral wall 25 outside of the cutting ridge 22 of the die to have an outward draft of no more than 0.5° to inhibit the buildup of a lip of plastic about the cutting ridge during the pressing of the medallion 14 into the thermoplastic substrate. In other words, as shown in FIG. 3, the direction of the peripheral wall 25 of the die should not slope outwardly from the vertical axis of the die as shown, looking upwardly along the die from the apex of the cutting ridge 22, by more than about one-half degree.

In the particular embodiment disclosed, a Kensol hot stamping machine Model No. 60T manufactured by Kensol-Olsenmark Co. of Melville, Long Island, is used to press die 16 against cap 10. This machine operates to advance die 16 by use of a hydraulic cylinder which is connected to the die through a toggle link to provide a great mechanical advantage, advancing the die with great force. The above apparatus also has two heating elements 26 for heating the die and a sensing element 28 for control of the die temperature (all shown diagrammatically in FIG. 2).

The apparatus which is diagrammatically shown in the drawings can be conventionally constructed to provide a continuous process operation for stamping medallions into thermoplastic substrates. A plurality of supports 11, each carrying a cap 10, can pass beneath die 16 and shaft 18 for embossing, being in registration with a moving foil sheet 20 which serves as a source of medallions 14.

Under typical reaction conditions, using a large Kensol hot stamping machine, the die is maintained at a temperature of about 400° F. during the operation. The dwell time, during which heavy pressure is exerted to press the medallion into the thermoplastic substrate, is from about one-half to three-fourths second.

The pressure exerted against the medallion and substrate varies with conventional pressing machines somewhat depending upon the area of the medallion. The initial pressure is desirably several thousand p.s.i., since in that situation the pressure rapidly drops to about 1,000 p.s.i. or less as the plastic under the medallion flows into conformance with the contour of the die.

When pressures are expressed in the specification and claims of this application, they are expressed in terms of pounds per square inch gauge.

From the foregoing, it will be observed that numerous variations and modifications may be effected without departing from the true spirit and scope of the novel concept of the invention. It is, of course, intended to cover by the appended claims all such modifications as fall within the scope of the claims.

That which is claimed is:

1. The process of forming a three-dimensional medallion embedded in the surface of a substrate comprising: supporting a preformed rigid thermoplastic resin substrate at a pressing station; positioning a flexible film above said substrate at said pressing station; providing a die at said pressing station, said die having a shape complementary to the three-dimensional shape of the medallion, and also having about its periphery a sharp cutting ridge; effecting relative movement between said die and substrate toward one another, whereby said cutting ridge severs said film and presses the severed portion against the substrate; compressing the severed film portion between said die and substrate with a pressure of at least 500 p.s.i. for a period of from 0.25 to 3 seconds; maintaining said die at a temperature of from 375° to 435° F. during the compressing step, said temperature and period being correlated to avoid the formation of a lip on the substrate beyond the area of die application, whereby the severed film portion is embossed to a configuration complementary to said die while the resin material immediately beneath the severed film portion is heated sufficient to flow and conform to the configuration embossed into the film portion, while inhibiting the flow of thermoplastic resin to areas outside of the area compressed by the die.

2. The process of claim 1 in which said film portion is carried to the surface of said substrate prior to compressing said film portion into said substrate.

3. The process of claim 1 in which said die compresses said piece of film against the resin substrate for a period of from one-half to 1 second.

4. the process of claim 1 in which said die compresses said piece of film against the resin substrate at a pressure in excess of 1,000 p.s.i.

5. The process of claim 1 in which said die is maintained at a temperature of about 400° F.

* * * * *